US008918725B2

(12) United States Patent
Arasaki et al.

(10) Patent No.: US 8,918,725 B2
(45) Date of Patent: Dec. 23, 2014

(54) SYSTEMS AND METHODS TO SUPPORT REAL-TIME INTEGRATED MOBILE COMMUNICATION FOR SOCIAL APPLICATIONS

(75) Inventors: Kenshi Arasaki, Bothell, WA (US); Wing-Hei Wilkins Chung, Bothell, WA (US); Eric Diep, Mississauga (CA)

(73) Assignee: A Thinking Ape Technologies, Vancouver, BC (CA)

( * ) Notice: Subject to any disclaimer, the term of this patent is extended or adjusted under 35 U.S.C. 154(b) by 461 days.

(21) Appl. No.: 13/221,821

(22) Filed: Aug. 30, 2011

(65) Prior Publication Data

US 2012/0060103 A1    Mar. 8, 2012

Related U.S. Application Data

(60) Provisional application No. 61/378,870, filed on Aug. 31, 2010.

(51) Int. Cl.
*G06F 3/01*      (2006.01)
*G06F 9/54*      (2006.01)
*H04L 12/58*     (2006.01)
*G06F 3/0481*    (2013.01)

(52) U.S. Cl.
CPC ............... *G06F 9/542* (2013.01); *H04L 51/04* (2013.01); *G06F 3/01* (2013.01); *G06F 3/0481* (2013.01); *G06F 2203/04803* (2013.01); *G06F 2209/545* (2013.01)
USPC ........................................................ 715/752

(58) Field of Classification Search
CPC .................................. H04L 51/04; G06F 3/01
USPC ........................................................ 715/752
See application file for complete search history.

(56) References Cited

U.S. PATENT DOCUMENTS 7,086,948 B2   8/2006   Yoshida
7,454,000 B1   11/2008  Henderson
(Continued)

FOREIGN PATENT DOCUMENTS

WO    WO0124036 A2     4/2001
WO    WO 2008/021184 A2   2/2008
(Continued)

OTHER PUBLICATIONS

Notification object as part of the Android SDK documentationhttp://developer.android.com/guide/topics/ui/notifiers/index.html and http://developer.android.com/guide/topics/ui/notifiers/notification.htm as of May 1, 2009 (Android).*

(Continued)

*Primary Examiner* — William Bashore
*Assistant Examiner* — Nathan Shrewsbury
(74) *Attorney, Agent, or Firm* — Harness, Dickey & Pierce

(57) ABSTRACT

A user interface on a mobile device includes an integrated communication region positioned within a viewable area of an application on the mobile device. The integrated communication region is configured to display a preview of content of a first message of a plurality of messages sent by a plurality of users. The first message is a most recent message of the plurality of messages. Visibility of the preview is persistent across a plurality of screens of the application. Across the plurality of screens of the application, (i) a position of the preview within the integrated communication region and (ii) the visibility of the preview remain unchanged until displaced by a second message. The second message is more recent than the first message.

42 Claims, 10 Drawing Sheets

(56) References Cited

U.S. PATENT DOCUMENTS

| | | | |
|---|---|---|---|
| 7,516,183 | B2 | 4/2009 | Shiigi |
| 7,562,028 | B1 | 7/2009 | Donner |
| 7,958,453 | B1* | 6/2011 | Taing ............................ 715/744 |
| 8,612,867 | B2* | 12/2013 | Scherpa et al. ............... 715/751 |
| 2001/0051982 | A1* | 12/2001 | Graziani ....................... 709/204 |
| 2002/0042799 | A1* | 4/2002 | Slotznick .................... 707/501.1 |
| 2003/0113100 | A1 | 6/2003 | Hecht et al. |
| 2004/0015548 | A1 | 1/2004 | Lee |
| 2004/0224772 | A1* | 11/2004 | Canessa et al. ................. 463/42 |
| 2005/0010641 | A1 | 1/2005 | Staack |
| 2005/0026697 | A1 | 2/2005 | Balahura et al. |
| 2005/0132298 | A1 | 6/2005 | Lueckhoff et al. |
| 2006/0041848 | A1 | 2/2006 | Lira |
| 2006/0136964 | A1 | 6/2006 | Diez et al. |
| 2007/0061244 | A1 | 3/2007 | Ramer et al. |
| 2007/0162569 | A1 | 7/2007 | Robinson et al. |
| 2007/0245249 | A1 | 10/2007 | Weisberg |
| 2008/0010608 | A1* | 1/2008 | Adams .......................... 715/781 |
| 2008/0034038 | A1 | 2/2008 | Ciudad et al. |
| 2008/0034040 | A1 | 2/2008 | Wherry et al. |
| 2008/0215428 | A1 | 9/2008 | Ramer et al. |
| 2008/0222295 | A1* | 9/2008 | Robinson et al. ............. 709/227 |
| 2008/0250035 | A1 | 10/2008 | Smith et al. |
| 2009/0005140 | A1 | 1/2009 | Rose et al. |
| 2009/0017913 | A1 | 1/2009 | Bell et al. |
| 2009/0100027 | A1 | 4/2009 | Malik |
| 2009/0101706 | A1 | 4/2009 | Boyd |
| 2009/0106376 | A1 | 4/2009 | Tom et al. |
| 2009/0125833 | A1* | 5/2009 | Abernethy et al. ........... 715/779 |
| 2009/0131175 | A1 | 5/2009 | Kelly et al. |
| 2009/0172565 | A1 | 7/2009 | Jackson et al. |
| 2009/0254840 | A1* | 10/2009 | Churchill et al. ............. 715/753 |
| 2009/0265245 | A1 | 10/2009 | Wright |
| 2009/0282421 | A1* | 11/2009 | Jaffer et al. ................... 719/317 |
| 2010/0037153 | A1 | 2/2010 | Rogers |
| 2010/0041457 | A1* | 2/2010 | Cook et al. ...................... 463/16 |
| 2010/0058202 | A1* | 3/2010 | Rostom ......................... 715/758 |
| 2010/0076994 | A1 | 3/2010 | Soroca et al. |
| 2010/0094878 | A1 | 4/2010 | Soroca et al. |
| 2010/0107089 | A1 | 4/2010 | Light et al. |
| 2010/0121705 | A1 | 5/2010 | Ramer et al. |
| 2010/0138756 | A1 | 6/2010 | Saund et al. |
| 2010/0146057 | A1 | 6/2010 | Abu-Hakima et al. |
| 2010/0184517 | A1 | 7/2010 | Danieli et al. |
| 2011/0083099 | A1* | 4/2011 | Eun ............................... 715/786 |
| 2012/0214564 | A1* | 8/2012 | Barclay et al. .................. 463/11 |
| 2012/0278740 | A1* | 11/2012 | Robinson et al. ............. 715/757 |
| 2013/0055099 | A1* | 2/2013 | Yao et al. ...................... 715/739 |
| 2013/0091204 | A1* | 4/2013 | Loh et al. ...................... 709/204 |
| 2013/0218721 | A1* | 8/2013 | Borhan et al. ............. 705/26.41 |
| 2013/0253934 | A1* | 9/2013 | Parekh et al. ................. 704/258 |
| 2013/0254718 | A2* | 9/2013 | Kermoian et al. ............ 715/841 |

FOREIGN PATENT DOCUMENTS

| | | | |
|---|---|---|---|
| WO | WO 2009/133531 | A2 | 11/2009 |
| WO | WO 2010/012988 | A1 | 2/2010 |

OTHER PUBLICATIONS

SpeedDate as described at http://www.androidguys.com/2009/05/12/speeddatecom-launches-first-major-dating-application-for-android/ as of May 12, 2009 (SpeedDate).*

Get time of chronometer widget as described on http://stackoverflow.com/questions/526524/android-get-time-of-chronometer-widget as of Feb. 8, 2009 (Get-time).*

Android in view of the Microsoft Gaming Zone as described at http://zone.msn.com/en/general/article/generalmessengergames.htm available as of Mar. 14, 2007 (MSN).*

* cited by examiner

SYSTEMS AND METHODS TO SUPPORT REAL-TIME INTEGRATED MOBILE COMMUNICATION FOR SOCIAL APPLICATIONS

CROSS-REFERENCE

This application claims benefit of U.S. Provisional Application No. 61/378,870, filed Aug. 31, 2010, which application is incorporated herein by reference in its entirety.

FIELD OF THE INVENTION

The invention relates to systems, devices, user interfaces, and methods for processing displaying digital content to a mobile device user.

BACKGROUND OF THE INVENTION

Mobile device applications have been designed and distributed for a variety of purposes. For example, many mobile device applications are designed for entertainment, social interaction, and productivity. One aspect that can be implemented across many different application types is communication with and among mobile device users. This can increase the social aspect of an application, and therefore, increase its utility. While mobile device users are acquainted with communication with other mobile device users by voice and text messaging, these methods of communication are typically geared toward one-to-one communication and are not usually implemented in applications. Applications implementing communication among and to users have either been cumbersome or have been implemented only to a limited extent. In particular, mobile device implementations of communication have generally not been effective for one-to-many and many-to-many communication.

Therefore, there is a need for improved implementations of integrated communication on mobile devices.

SUMMARY OF THE INVENTION

The present invention generally relates to the field of integrated communication on a mobile device. In some embodiments, the present invention relates to systems, devices, user interfaces, and methods for displaying content to a mobile device user. The user interfaces can be graphical user interfaces. The invention provides for a persistent integrated communication region that can be persistent across screens within an application and across screens in different applications. The persistent integrated communication region can be in a compact format that is accessible across all application content on an internet enabled mobile device. The persistent integrated communication region can allow for communication among a plurality of mobile device users, and for distribution of announcements and broadcasts to mobile device users. The announcements may be system announcements. The integrated communication region, or other communication regions discussed herein, can display information from one or more channels of a plurality of dispatch channels. The communication among mobile device users can be in chat rooms, where multiple users send and receive messages simultaneously and in real-time. The communication regions can be for one-to-many and many-to-many communication. The persistent nature of the integrated communication region, which can become an expanded communication region with input capabilities, can facilitate two-way communication by reserving a region in a viewable area on a mobile device to be always or almost always used for communication.

Content that is rendered in an integrated communication region or an expanded communication region can be filtered by a messaging server or an application server that delivers the content to a mobile device. The filtering can be based on geography, user profile, user status, and language. A user profile's can be used as a filter based on the user profile's interests, level, game rank, activity rate (e.g., frequency of using the application), and/or engagement level (e.g., level of interaction with other users or the application). User status can be used as a filter based on whether the user is logged in, and/or time since activity. The filtering can be application specific. The content rendered in a communication region, which can be text, icons, emoticons, images, or symbols, can have one, two, three or more colors, flash, and/or be animated.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawing(s) of which:

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein can be employed in practicing the invention.

The invention provides for systems, user interfaces, and methods for displaying an integrated communication region within an application on a mobile device. The integrated communication region can be implemented in one or more applications that are executed on a mobile device. The integrated communication region can be a chat preview window. Various aspects of the invention described herein may be applied to any of the particular applications set forth below or for any other types of user interfaces and displays. The applications can be of any type, including applications for entertainment, productivity, news, search tools, music, business, social networking, sports, travel, weather, games, utilities, and web browsers. The invention may be applied as a standalone system or method, or as part of an integrated software package, such as a mobile game. It shall be understood that different aspects of the invention can be appreciated individually, collectively, or in combination with each other.

Figure 1:
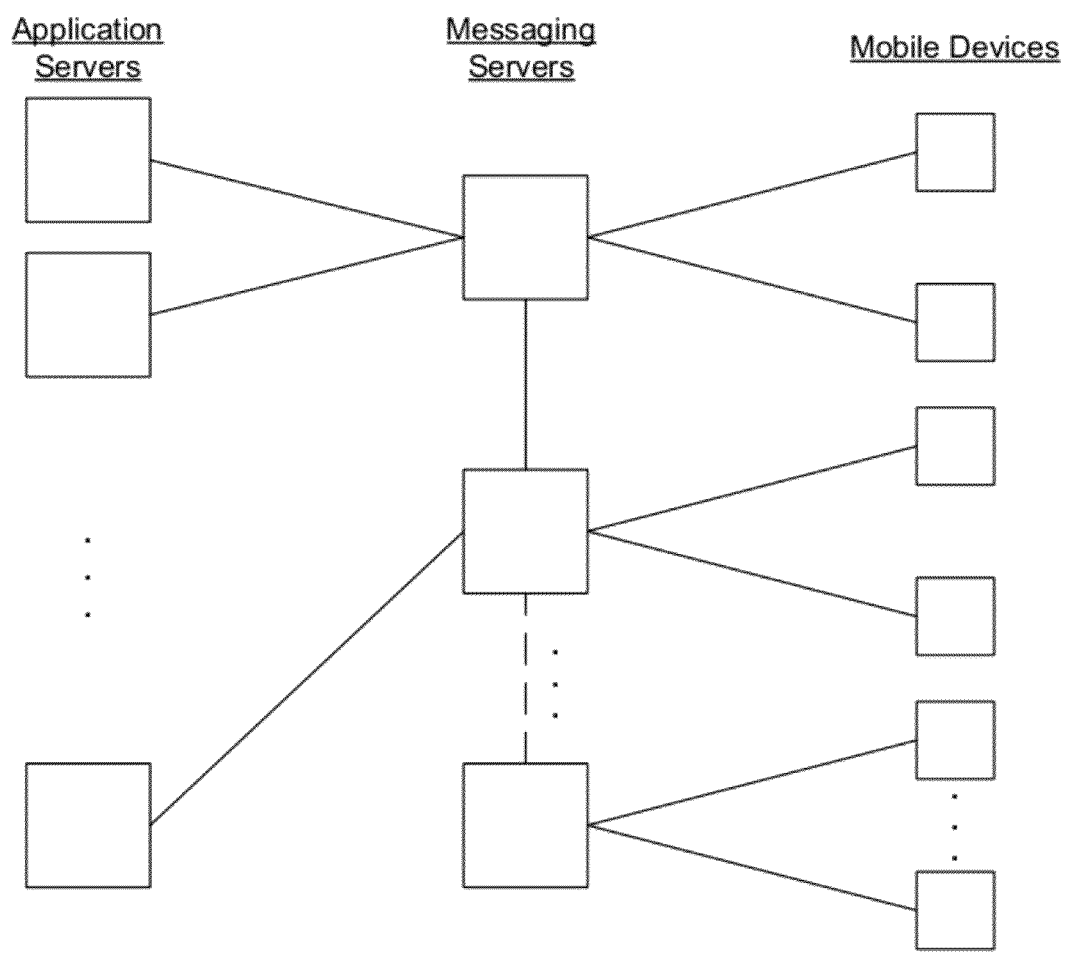
FIG. 1 shows a system including a plurality of application servers and messaging servers for displaying information on mobile devices.

A system for displaying information on a mobile device can include one or more application servers, messaging servers, and mobile devices that are all in electronic communication. As shown in FIG. 1, one or more mobile devices can receive and send information to a messaging server, which in turn can send and receive information to other messaging servers and/or application servers. In some embodiments, one mobile device can receive information directly from another mobile device, or can receive information from another mobile device through one or more messaging server and/or one or more application server.

In some embodiments, an application server may support an application, such as a mobile application. Examples of such applications may include games, utilities, social networking, news, entertainment, or any other of the applications mentioned above. An application server may communicate with a mobile device regarding one or more application that may operate on the mobile device. The application may be stored in the memory of the application server and/or mobile device.

In some embodiments, a messaging server may support a messaging or chat service. The messaging service may or may not be integrated with one or more applications. In some embodiments, the messaging or chat service may be part of the application. In some embodiments, messaging services may be provided external to or separate from one or more applications. In some embodiments, the messaging or chat service may be accessed by an application to provide messaging functionality for the application. The messaging or chat service may be accessed by one, two, or more applications. In some embodiments, the applications and the messaging services and/or servers may be affiliated with one another or may belong to, be operated by, or affiliated with, the same entity. Alternatively, one or more applications or messaging services may be owned, operated, or affiliated with different entities.

In some embodiments, a server may perform the functions of both an application and messaging server. In other embodiments, different servers may be devoted to applications and messaging or chat features. In some embodiments, one application server, or a plurality of application servers may access a single messaging server. In another embodiment, one application server or a plurality of application servers may access a plurality of messaging servers. One mobile device, or a plurality of mobile devices may access one messaging server or a plurality of messaging servers.

An exemplary mobile device can include a smart phone, Blackberry phone, iPhone, Android phone, WebOS phone, or Symbian phone. Other examples of mobile devices may include laptop computers, tablets, personal digital assistants (PDAs) or any other network device. Any discussion herein of mobile devices may also be applicable to other network devices, such as desktop or other computers. For example, a display may be provided by other network devices which may or may not be mobile that may include the aspects, embodiments, and features described.

A mobile device may have a processor and/or a memory. A mobile device may receive non-transitory computer readable media, which may contain instructions, logic, data, or code that may be stored in persistent or temporary memory of the mobile device, or may somehow affect or initiate action by a mobile device.

A mobile device for displaying an integrated communication region can include executable logic that can display information stored on the mobile device and information received from an external source, such as an application server, a messaging server, another mobile device, or any combination thereof. The mobile device can receive information from the external source by an internet connection, a wireless network, or a cellular network. The mobile device can be connected to any type of network, including an 802.11, PCS, CDMA, WCDMA, TDMA, 3G, EV, 4G, 5G, GSM, EDGE, HSPA, HSPA+, LTE, and WiMAX network.

It should be noted that the various mobile devices and functions or processes disclosed herein may be described as data and/or instructions (software) embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, email, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the systems and methods may be processed by a processing entity (e.g., one or more processors) within the computer system in conjunction with execution of one or more other computer programs (See FIG. 1).

A mobile device can receive information from an external source by polling. For example, the mobile device can request information from a server at specified intervals. The intervals can be about or no more than about, or more than about 1, 2, 3, 4, 5, 10, 20, 30, 40, 50, 60, 120, or 180 seconds. The mobile device can request information at regular or irregular intervals. For example, the mobile device may request information at intervals on the order of microseconds, milliseconds, seconds, multiple seconds, minutes, quarter hours, or hours. The mobile device may request information in response to a signal or event. In other embodiments, a mobile device can receive information from an external source using push technology. An external source can send the information to a mobile device user as the information is made available.

In some embodiments, an integrated communication region is implemented in a massively multiplayer game. An integrated communication region may be implemented in any application. The integrated communication region can be persistent across a plurality of screens within an application and across a plurality of applications. The plurality of applications may include a plurality of multiplayer games or other applications. In some embodiments, the plurality of applications may be the same type of applications (e.g., plurality of games) or may span different types of applications (e.g., a game and social networking site). Some screens may optionally not include an integrated communication region. For example, the integrated communication region can be hidden when a purchase screen is displayed.

The persistent integrated communication region can facilitate communication with a user of a mobile device. Because the communication region is persistent, a user can always or almost always receive messages regardless of what screen they are viewing within an application. This always on-nature of the communication can allow for rapid and more effective dissemination of information. The percent of users using an application at a given time that will have the opportunity to see a message or announcement can be about or greater than about 30, 40, 50, 60, 70, 80, 90, 95, 97, 99, or 100%. Alternatively, the percent of mobile devices running an application at a given time showing an integrated communication region can be about or greater than about 30, 40, 50, 60, 70, 80, 90, 95, 97, 99, or 100%. This can increase the entertainment and/or commercial value of an application and the impressions of a given message, announcement, or broadcast.

Figure 2:
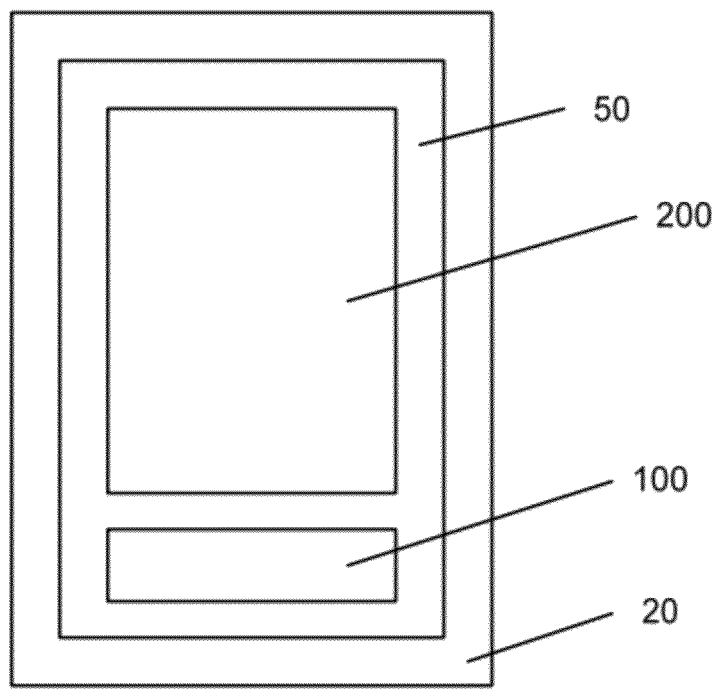
FIG. 2 shows a mobile device with a viewable area having regions for an integrated communication region and application content.

FIG. 2 shows an example of a mobile device (20) with an integrated communication region (100). The mobile device can be handheld, wireless, powered by a rechargeable or disposable battery, or any combination thereof. The device can have a touch screen, a keyboard, buttons, a camera, or an led light. In some embodiments, the device may have a clock. In some embodiments, the mobile device can weigh about or no more than about 10, 25, 50, 75, 100, 120, 140, 160, 180, 200, 250, 300, 350, or 400 grams.

The mobile device can have a viewable area (50) that can display a screen to a user. A screen can also be referred to as an application screen. The viewable area can have a variety of shapes, including a rectangle, square, circle, or triangle. The viewable area can be about, no more than about, or greater than about 1, 2, 3, 4, 5, 6, 7, 8, 9, 10, 11, 12, 13, 14, 16, 18, 20, 25, 30 or 35 square inches. The viewable area can be an lcd, led, amoled, super amoled, e-ink, or electrophoretic display.

Figure 3:
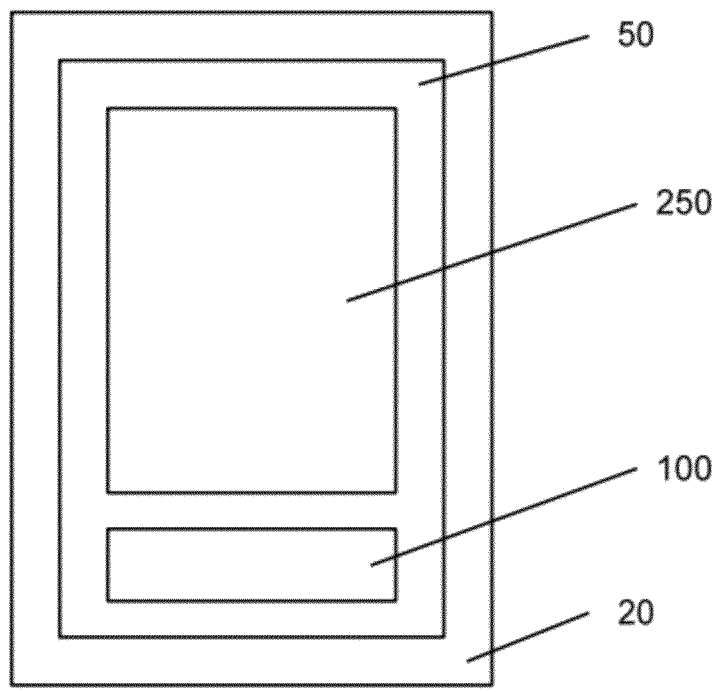
FIG. 3 shows a mobile device with a viewable area having regions for an integrated communication region and application content.

In some embodiments, an application screen can have content (200) that is displayed when an application is launched. The integrated communication region (100) in FIG. 2 can be persistent across multiple screens, or as the content (200) changes. For example, a second screen, shown in FIG. 3, can display different content (250) to a user, while displaying the same integrated communication region (100) that is shown in FIG. 2. The different content displayed in across application screens can be information relating to distinct features of the application, for example, a game application can display content related to a user profile, quests, allies, battles, news, clans, marketplace, or kingdoms. The integrated communication region (100) can be redrawn when a new screen is displayed, but the information in the integrated communication region can be the same across screens. In some embodiments, the integrated communication region may appear the same as the content changes. Alternatively, the appearance of the integrated communication region may vary as the content changes. The integrated communication region may be configured to display communications related to the first content and the second content, or any other content that may be displayed with the integrated communication region.

An integrated communication region displayed on a mobile device may provide messages or updates to a user of the mobile device. The mobile device may also accept an input from the user and display the input or information related to the input in the integrated communication region. For example, if the integrated communication region includes chat messages associated with multiple applications, the user may type a chat message into the integrated communication region. In some embodiments, the chat message may be displayed to users related to the current application that is being displayed. In other embodiments, the chat message may be displayed to users related to all or selected applications that are associated with the integrated communication.

This may advantageously enable a user to track activities occurring with respect to a plurality of applications or parts of an application while accessing specific parts of an application. For example, if a user is playing a plurality of multiplayer games simultaneously, a user can focus on one game, while an integrated action window may indicate if an event occurs in the other game. If the user switches to another game, the integrated action window may indicate if an action occurs in the first game. Similarly, a user can maintain a chat window that remains open and visible while a user accesses a number of different applications, such as a social networking website, reading email, reading the news, browsing the web, and so forth.

In some embodiments, an integrated action window may automatically incorporate actions or messages from one or more associated application that may be open. In some embodiments, it may be incorporated with all applications that may be open. In other embodiments, a user may be able to select which applications may implement the integrated action window.

The integrated communication region or chat box can be positioned anywhere within the viewable area of a display device. As shown in FIG. 2, a user interface may include the integrated communication region, which can be positioned toward the bottom of a viewable area. In other embodiments, the integrated communication region can be positioned toward the top, left, or right side, corner, or center of a viewable area. The position of the integrated communication region can be the same across different screens of the application and different applications. In some embodiments, the integrated communication region may remain identical in appearance across the different screens of an application or different applications. The integrated communication region can be uniform across a plurality of application screens or have the same or a persistent configuration across a plurality of application screens. In other embodiments, the position of the integrated communication region or some other aspect of the appearance of the integrated communication region may change across different screens of the application and the different applications. For example, depending on the format of the display across the multiple screens of the same or different applications, the integrated communication region can be displayed to fit/accommodate the format. In some embodiments, the location of the integrated communication region may be fixed. Alternatively, a user may be able to adjust the location of the integrated communication region, reshape it, or resize it. The integrated communication region can be placed over a background content in a transparent or semi-opaque manner, or can completely block any background content. In other embodiments, the integrated communication region is not placed over any background content.

The integrated communication region can include a plurality of fields, including fields for a channel name, a handle or alias name, and a message. The configuration of the fields can be constant, persistent, or uniform across a plurality of application screens. The positions of the fields relative to each other can be constant across a plurality of application screens. For example, the channel field can always be positioned to the left of the alias field, which is to the left of the message field. The previous fields, collectively, can always be positioned above an input field. The integrated communication region can also have a persistent format across a plurality of application screens. Formatting can include spacing, font, colors, color scheme, tables, borders, design, and shapes.

In some embodiments, the integrated communication region can have a size or occupy an area that is about, no more than about, or more than about 2, 5, 10, 15, 20, 25, 30, 35, 40, 45, 50, 60, 70, or 80% of the size of the viewable area of the mobile device. The size of the integrated communication region can scale proportionally with the size of the viewable area.

Any number of persistent communication regions may be displayed on a viewable area/screen of a device. For example, about, more than, or less than, 1, 2, 3, 4, or more chat or action regions may be displayed. In some embodiments, each of the regions may serve the same purpose. In other embodiments, the regions may have specialized purposes. For example, one region may include actions that occur in the various applications, another may include messages from users in the various applications, another may include broadcasts from the various applications. In another example, the regions may be associated with selected applications or types of applications. For example one region may include actions and messages relating to a particular type of application (e.g., games) while another region may include actions and messages relating to another type of application (e.g., social networking and chats).

The persistent communication region can display messages, announcements, broadcasts, or any other type of information from a feed source, described later herein. The messages can scroll upward, downward, or to the side. Older messages can scroll up, down, right, or left as new messages replace or displace the older messages. In some embodiments, a first type of message can scroll vertically as it is replaced with newer messages and a second type of message can remain in a permanent location in the persistent communication region. In other embodiments of the invention, a first type of message can scroll upward, and a second type of message can scroll horizontally. In some embodiments, a user may optionally be able to scroll back to older messages or forward to newer messages. In some embodiments, the message may have a time indicator. For example, the message may include when the message was sent, or how much time has elapsed since the message was sent. Such time indicators may be determined based on a clock of the mobile device, or an external clock. Any of the aforementioned embodiments may include one or more messages, including new messages, which "flash" thereby changing colors, brightness intensity or otherwise altering their appearances to better catch the attention the user. Such alterations or flashing, by itself or in combination with various movements of the messages mentioned above, provide an added visual effects or animation of the messages.

In some embodiments, the integrated communication region can display only a portion of a message, or a portion of the messages. In some embodiments, the integrated communication region is a preview window of the available messages. The integrated communication region can display 1, 2, 3, 4, 5, 6, 7, 8, 9, or 10 lines of messages. In other embodiments, the integrated communication region can display no more than or greater than 1, 2, 3, 4, 5, 6, 7, 8, 9, or 10 lines of messages. Messages that extend greater than one line can be truncated. Truncation of a message can be indicated by an ellipses. In some embodiments, selecting a truncated message may allow a user to access the full message. For example, clicking or touching a truncated message may cause the entire message to popup in a new window, or for a chat box to expand.

Figure 4:
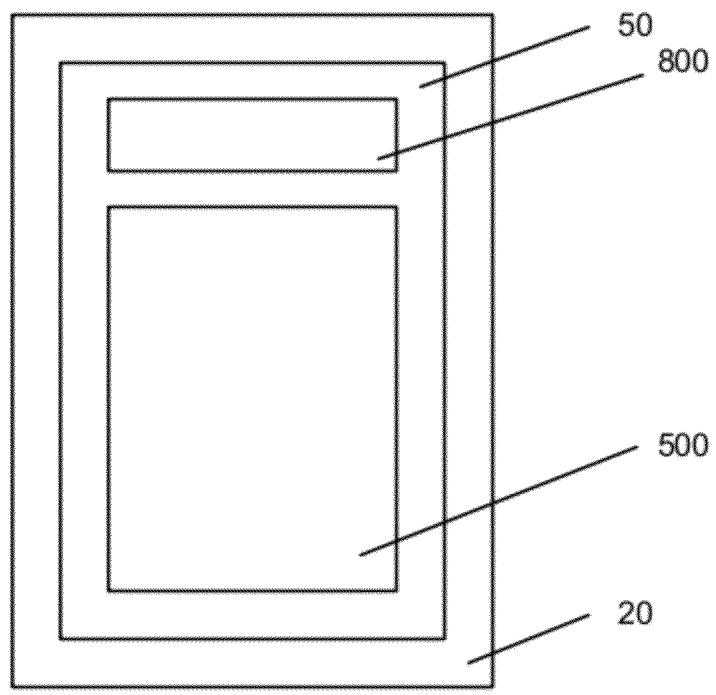
FIG. 4 shows a mobile device with a viewable area having a region for an expanded integrated communication region and application content.

As shown in FIG. 4, the integrated communication region or zone can be enlarged to an expanded communication region (500). A screen showing an expanded communication region (500) can also show additional content (800). The additional content can identify the application screen type and include other information relevant to the application. In some embodiments, the additional content region may include one or more channel. In some instances, channels may be indicated by tabs or buttons. A user may select a tab or button in order to select a desired channel. The channel may filter the type of message or communication provided to the user. The channel may filter messages or communications within the same application or multiple applications.

The expanded communication region (500), like the integrated communication region (100), can be persistent across multiple screens. The additional content can change across screens while the expanded communication region is persistent.

In some embodiments, the expanded communication region displays messages in a scrollable format. For example, older messages that have been replaced with new messages can be accessed by scrolling up, down, right, or left. The older messages may be limited or restricted by memory capacity, time, or number. For example, only the last two lines of message can be displayed in an integrated communication region and an expanded communication region can expand to display only the last 10 messages.

The expanded communication region can be about, no more than about, or greater than about 1.5, 2, 3, 4, 5, 6, 7, 8, 9, or 10 times larger than the integrated communication region. The expanded communication region can have a size or occupy an area that is about, no more than about, or greater than about 20, 25, 30, 35, 40, 45, 50, 55, 60, 65, 75, 80, 85, 90, 95, or 100% of the size of the viewable area of the mobile device. The expanded communication may have a fixed size or location, or may be adjusted by a user.

The expanded communication region can be displayed by selection of a button in the integrated communication region.

The expanded communication region can expand over the viewable area starting at the integrated communication region. For example, if the integrated communication region is located toward the bottom of a viewable area, the expanded communication region can expand upward from the bottom of the viewable area.

The expanded communication region may shrink back to an original size of the integrated communication region. In some embodiments, a user may click or touch something that may cause the expanded communication region to shrink. In other embodiments, the expanded region may shrink after a predetermined period of time of inactivity.

The integrated communication region and the expanded communication region can display information from one or more feed sources. The communication regions can display one channel of one or more possible channels. Exemplary channels include world, clan, and ally chat channels. Channels may be provided by the same application or different applications. For example, the communications region may display communications through a first channel from a first application and communications from a second channel from a second application. In one illustration, a communication region may show a communication from a user playing a first game and a communication from a user playing a second game within the same region. The feed sources can be received by a mobile device from any external source described herein. The feed sources can include data from other users of the applications, messages sent from system administrators, messages sent by advertisers, announcements, broadcasts, and messages generated by an application server or messaging server. The feed sources can include messages from about, greater than about, or no more than about 1, 10, 100, 1,000, 10,000, 100,000, 1,000,000, 10,000,000, or 100,000,000 different users. In some embodiments, the messages can be messages from an unlimited number of users. The information displayed in an integrated communication region or an expanded communication region can be information from other applications or messages from users in other applications.

The communication region may display which application or channel that the message is arriving through. For example, the name of the application (e.g., Game 1, Game 2, etc.) may be displayed alongside the message or somehow otherwise visually mapped to the message. In other embodiments, other visual indicates relating to the application may be used. For example, messages from a first application may be displayed in a first color of text while messages from a second application may be displayed in a second color of text. The communication channel (e.g., name of clan, ally, or user) used to send the message may also be displayed beside or visually mapped to the message.

In some embodiments, the information displayed in an integrated communication region or an expanded communication region can include messages, text messages, pictures, images, emoticons, icons, avatars, symbols, and ASCII-art. The information displayed in the integrated communication region can comprises one or more feature selected from the group consisting of flashing text, flashing images, multiple colors, animated icons, and symbols. The messages can have one or more colors, flash, or be animated. In some embodiments, information displayed in an integrated communication region or expanded communication region can be accompanied by a notification, such as a sound, a blinking light or led, or a vibration. The information in the integrated communication region and the expanded communication region can scroll up, down, left, right, or any combination thereof. Some messages may be permanent, and others may scroll upward and out of the viewable area on a mobile device. In some embodiments, only new information can cause information in the integrated or expanded communication region to be cleared, removed, or displaced. In other embodiments, information displayed in a communication region, such as a message from a user, will not be cleared, removed, or displaced by selecting the message. Permanent messages, which can be announcements, can scroll horizontally so that messages that don't fit within a permanent region can be fully displayed over a specified period of time, or at a specified rate. The communication regions can be such that some information is displayed in the communication region at all times. Alternatively, the communication region can always be populated with information, which may change from time to time, from one of a plurality of feed sources.

The feed source data can be displayed in an integrated communication region or an expanded communication region in real-time. Real-time messages can be displayed in a communication region within less than about 0.1, 0.5, 1, 5, 10, 30, 60, or 180 seconds of being sent. For example, a chat message sent on a first mobile device can be displayed in an integrated communication region on a second mobile device in about or no more than about 0, 1, 2, 3, 4, 5, 10, 15, 30, 45, 60, or 120 seconds.

In some embodiments, a message sent from a mobile device can cost a user some amount of currency. The amount or ease at which a user can obtain the currency and the cost of sending a message can be balanced to limit the rate of overall messaging in the system or the number of messages a mobile device will receive over a period of time. For example, the available currency (cost of obtaining the currency) and the cost of sending a message can be designed such that a mobile device can expect to receive about or no more than about 0.05, 0.1, 0.2, 0.3, 0.4, 0.5, 0.75, 1, 2, 3, 4, or 5 messages per second. Exemplary ways to adjust the ease at which with which a user can obtain currency is to change the real monetary cost of the game currency, or change the rate at which game currency is automatically given to a user.

In other embodiments, the information that is delivered to a mobile device can be filtered or can be contextual. Each mobile device in the system may not see the same messages as another device in the system. The information can be filtered based on geography (proximity, time zone, and/or continent), language, application, length, user profile or status, or user selected filters. In other embodiments, messages can be filtered based on affiliation status, such as whether the users belong to the same clan or are allies.

For example, messages from users in North America can be filtered or restricted from being delivered to users in Asia and vice-versa. Alternatively, a user can choose not to see messages from other users that are more than 50 miles away from their location. In some embodiments, an application server or a messaging server can perform the filtering and determine which messages get delivered to a specified mobile device.

Similar to the design of the cost of obtaining currency and the cost of sending a messaging, the filtering of messages or data can be designed to restrict the number of messages a mobile device can expect to receive over a period of time.

EXAMPLES

Example 1

Integrated Communication Regions

FIG. 5, FIG. 6, FIG. 7, and FIG. 8A show various screens with an integrated communication region (100) on a mobile device.

Figure 5:
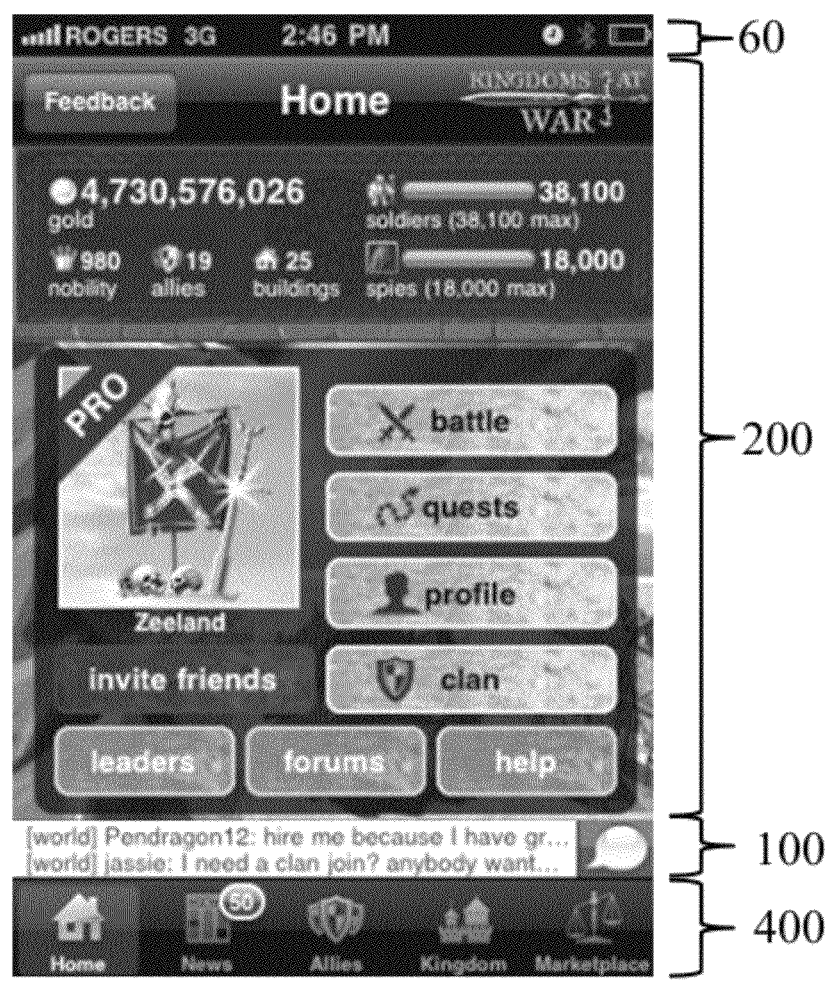
FIG. 5 shows an example of a viewable area on a mobile device with an integrated communication region and a home screen for an application.

FIG. 5 shows a Home screen, as identified in a title bar in the content region (200). A phone status bar (60) is shown above the content region (200). The content region has other screen-specific information. As shown in FIG. 5, the content region has information on a user's gold, soldiers, spies, nobility, allies, and buildings. The content region also has buttons for selecting other screens, such as a battle, quests, profile, clan, news, allies, kingdom, and marketplace screen. The content region also has buttons for inviting friends, viewing leaders, viewing forums, and viewing help.

The integrated communication region (100) shows two lines of messages. The messages are from two different users and message content that does not fit in the integrated communication region is truncated, as indicated by the ellipses. The type of message content, in this case a world chat message, is indicated in brackets on the left hand side. The individual user sending the message is indicated to the right of the bracket. The right hand side of the integrated communication region shows a chat bubble that can be selected, which causes an expanded communication region to be displayed.

A screen selector bar (400) is shown below the integrated communication region (100). The screen selector bar can be persistent across screens to allow easy selection of various screens of the application.

Figure 6:
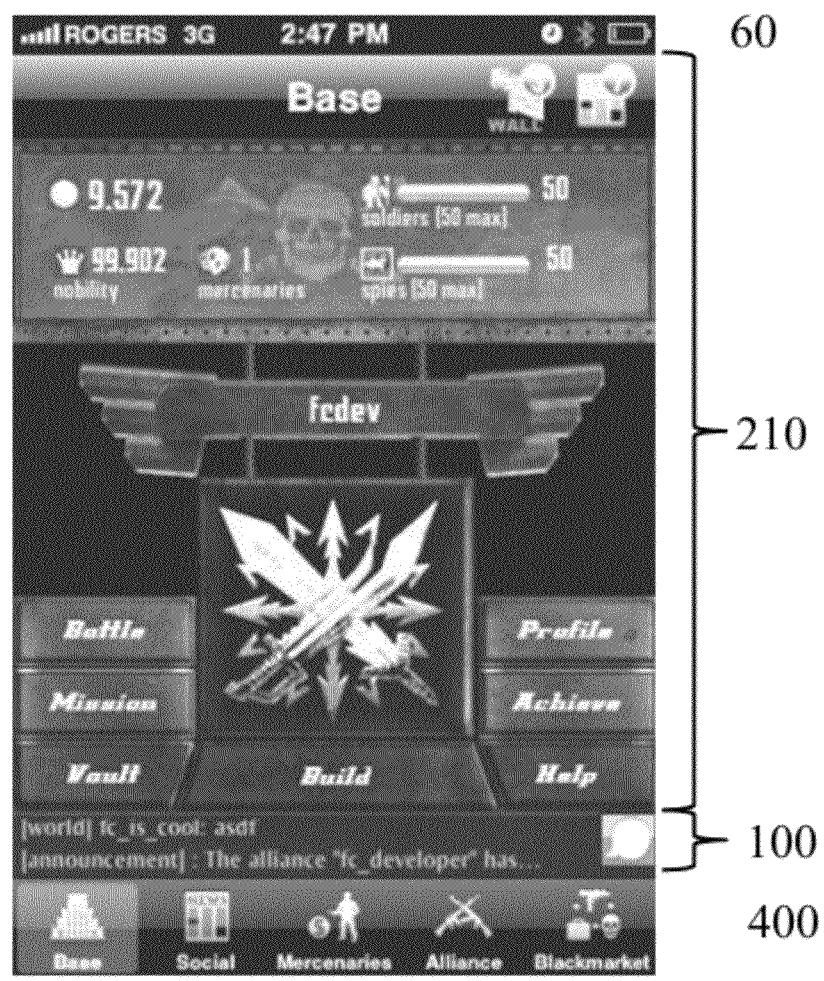
FIG. 6 shows an example of a viewable area on a mobile device with an integrated communication region and a Base screen for an application.

FIG. 6 shows Base screen with an integrated communication region (100). The content region (210) of the screen indicates that the screen is the Base screen. Like the Home screen shown in FIG. 5, the integrated communication region displays two lines of messages. In FIG. 6, the second line of messages is an announcement, as indicated within the brackets. The Base screen shown in FIG. 6 is a screen in an application different from the application in FIG. 5, and, as described herein, the integrated communication region is in the same position within the viewable area of the mobile device.

Figure 7:
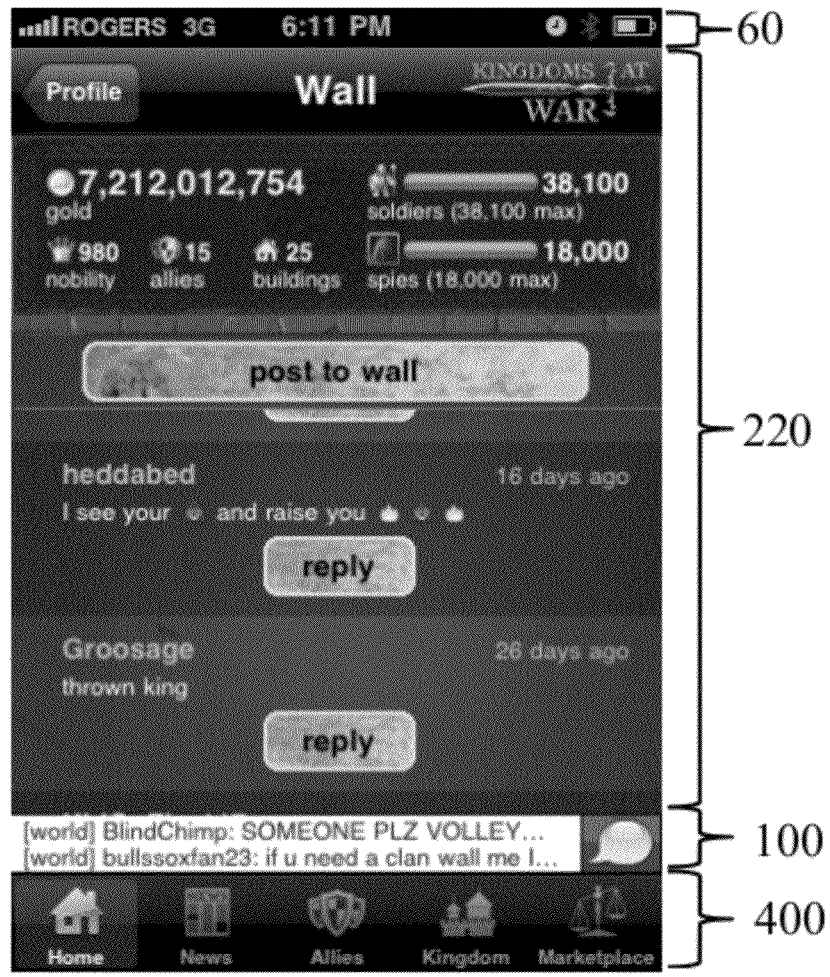
FIG. 7 shows an example of a viewable area on a mobile device with an integrated communication region and a Wall screen for an application.

FIG. 7 shows a Wall screen of an application. The content region (220) of the Wall screen shows messages posted to a users wall. The integrated communication region (100) shows a message in the second line having a plurality of colors. Here, the circular symbols are three different colors. The use of colors and/or flashing, as described herein, can facilitate bringing attention to the message. Here, a user intends to bring attention to all other users of the application to hire his or her allies.

Figure 8A:
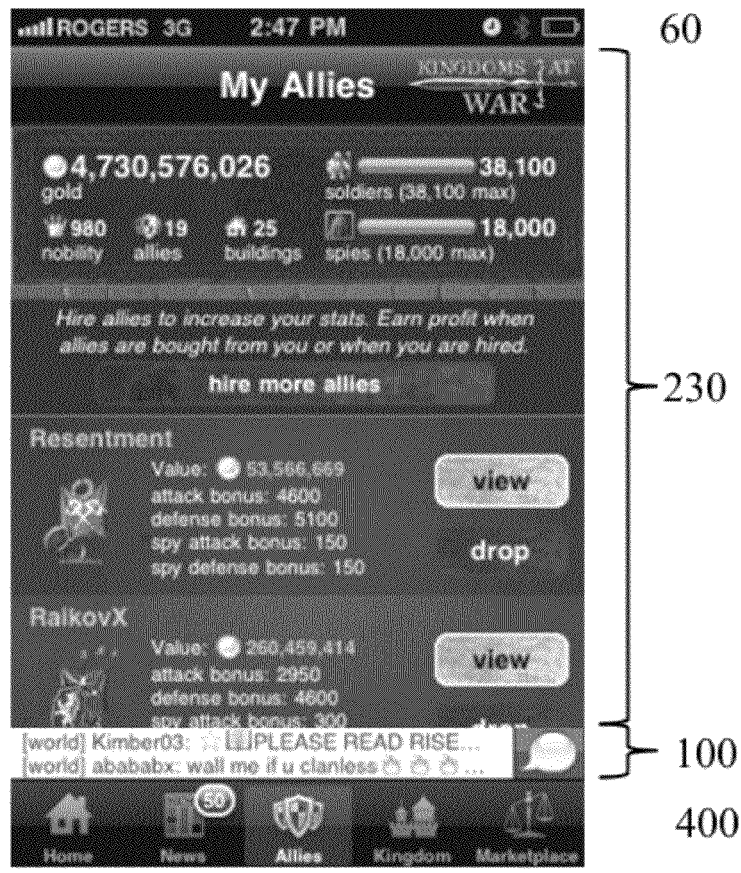
FIG. 8A shows an example of a viewable area on a mobile device with an integrated communication region and a My Allies screen for an application.

FIG. 8A shows a My Allies screen of an application. The content region (230) of the screen shows a user's allies. The integrated communication region (100), like the other integrated communication regions shown in FIG. 5, FIG. 6, and FIG. 7 are all located in the same position. The integrated communication region (100) shown in FIG. 8A also includes symbols, such as stars, and animated icons for fire, in the messages.

Figure 8B:
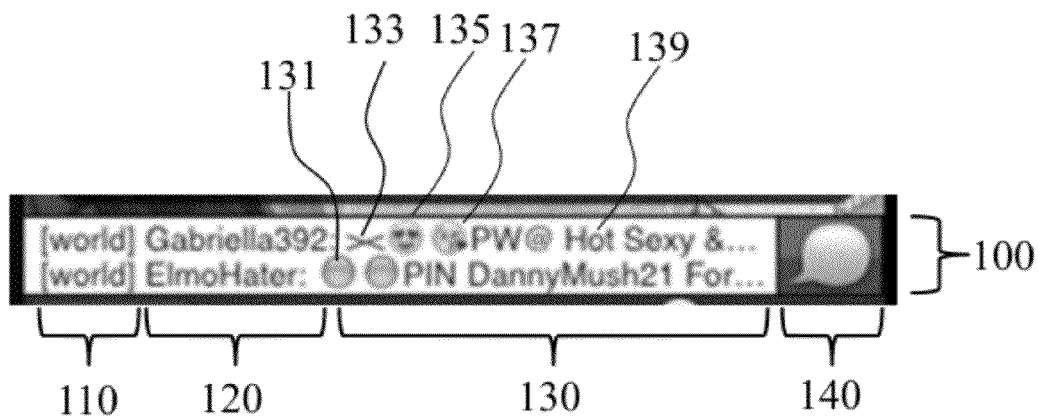
FIG. 8B shows an example of an integrated communication region.
Figure 9:
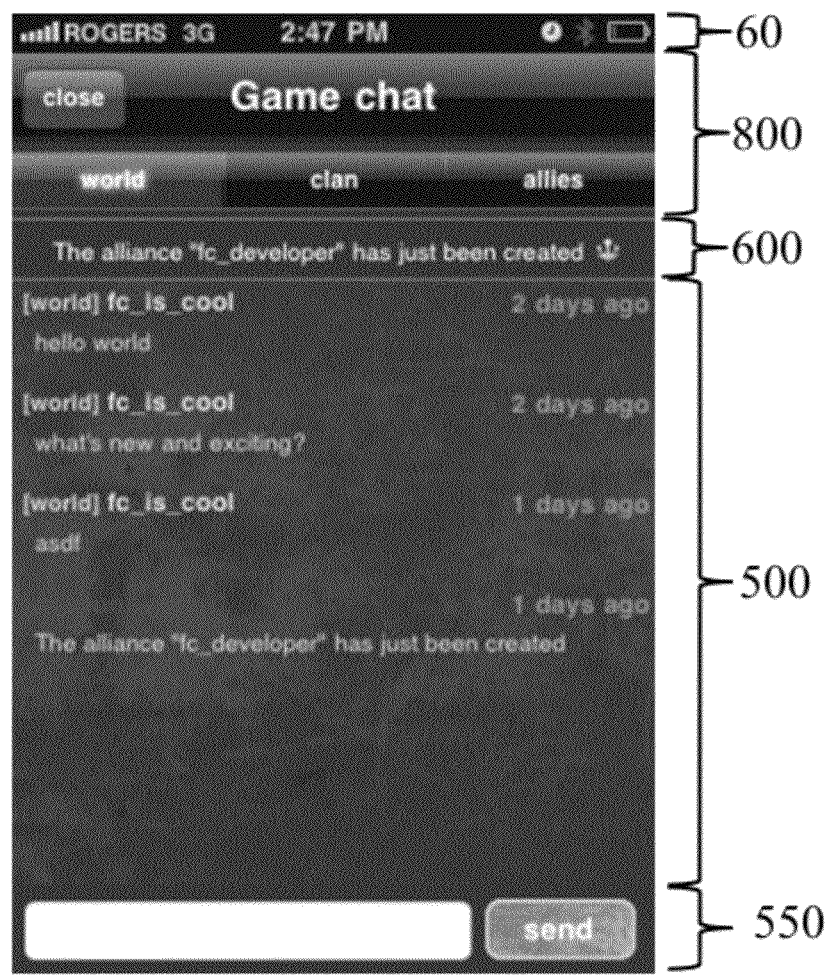
FIG. 9 shows an example of a viewable area on a mobile device with an expanded communication region showing a world channel and an announcement.

FIG. 8B shows another image of an integrated communication region (100) or a chat bar. The integrated communication region can display multiple lines of messages. The messages can be truncated, which may be indicated by ellipses. Selection of a message can allow for the message to be shown in an expanded communication region (e.g., as shown in FIG. 9). Each line of a message, or some of the lines in the integrated communication region can include selected fields of information. The fields can be pre-selected information fields. The fields of information can include a channel indicator (110), an alias or handle field (120), and a message field (130). The message field can have text, symbols, emoticons, images, icons, ASCII-art, and avatars. FIG. 8B shows examples of a symbols and icons (131, 133), emoticons (135, 137), and text (139). Use of animation, symbols, icons, emoticons, images, ASCII-art, avatars, colors, and flashing can allow users to attract more attention to their messages. In some embodiments, use of these features can cost the user some amount of currency. The currency can be paid to a provider. The currency or any other currency described herein may be earned by the user by performing one or more activities or by making a monetary payment. In other embodiments, the user may obtain the currency based on a pre-selected rate.

As shown in FIG. 8B, the integrated communication region or chat bar can also have communication button (140) that allows a user to input a message to be displayed in the integrated communication region. Selecting the communication button (140) can cause the expanded communication region to be displayed. The expanded communication region can also have a field (such as a message sending region, described herein) that, when selected, displays an input screen that allows users to input a desired message with symbols, icons, emoticons, images, ASCII-art, avatars, colors, and flashing. The input screen can have features such as a virtual keyboard and various buttons that allow a user to create the message. Selecting the communication button (140) can also cause an input screen with an input field to appear, wherein the user can create a desired message. As with other communication regions described herein, the user may be thus provided with an integrated input and/or display area to facilitate two-way communication with one or more users.

Example 2

Expanded Communication Regions

Figure 10:
FIG. 10 shows an example of a viewable area on a mobile device with an expanded communication region showing a world channel.
Figure 11:
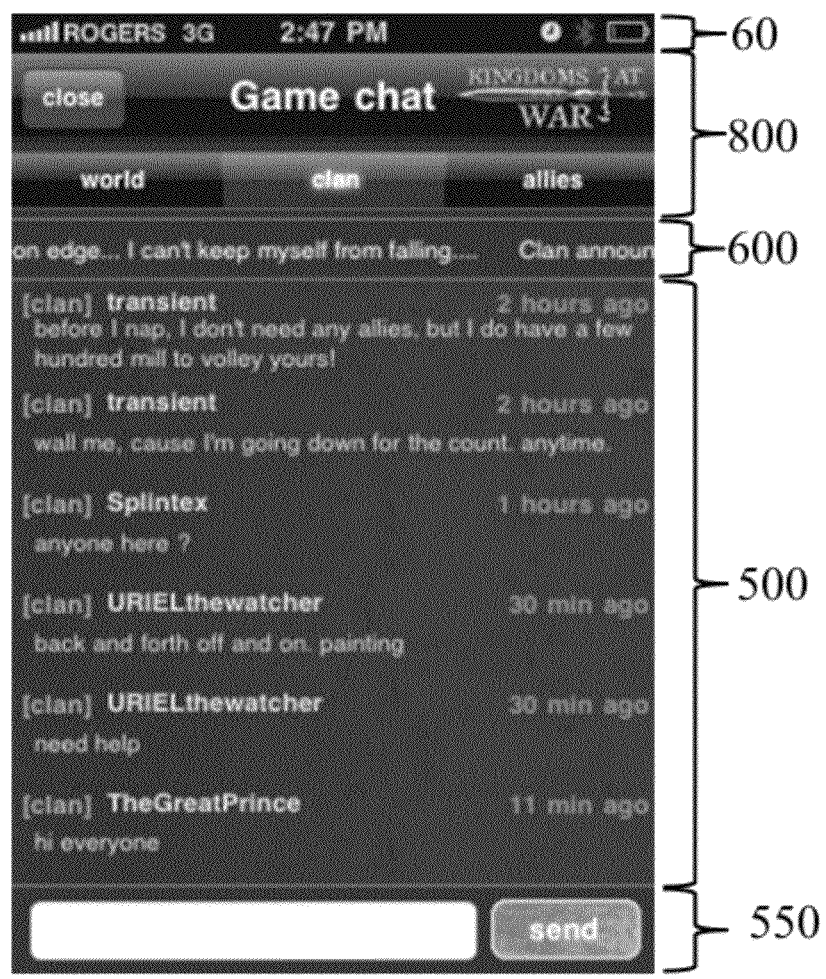
FIG. 11 shows an example of a viewable area on a mobile device with an expanded communication region showing a clan channel.

FIG. 9, FIG. 10, and FIG. 11 show expanded communication regions (500) within a viewable area on a mobile device.

FIG. 9 shows a phone status bar (60), content region (800), and an expanded communication region (500, 550, and 600). The content region (800) can have buttons fields that select which channel is displayed in the message receiving region (500). For example, in FIG. 9, the world channel is selected, and messages from the world channel source are displayed in the message receive region (500). Selection of either the clan or allies buttons in the content region (500) can cause the clan or allies channels, respectively, to be displayed in the message receiving region. The expanded communication region (500, 550, and 600) can include an announcement region (600), a message receiving region (500), and a message sending region (550). The announcement region (600) can be permanent. Messages that do not fit within the announcement region (600) can scroll horizontally. Each message can have a time indicator, showing how long ago the message was sent or received. The time indicator can say, for example, 1, 2, 3, 4, 5, 6, 7, 8, 9, 10 or more years, months, weeks, days, hours, minutes or seconds ago. The message receiving region (500) can also display announcements, as indicated in the last message line of the message receiving region. An announcement can be in a different color relative to the other messages in the message receiving region.

Selecting the message sending region can cause a virtual keyboard to pop up, such that user can input a desired message. The desired message can include symbols, icons, emoticons, which may be colored or flashing. The symbols can include thumbs up symbols, fire, targets, and dart boards with darts.

FIG. 10 shows another view of an expanded communication region (500, 550, and 600). The screen shows a scrolling announcement in the announcement region (600) or the expanded communication region. The message receiving region in FIG. 10 (500) also includes messages with icons and symbols. For example, the message from caliss shows a message with thumbs-up icons, the message from bb316 shows icons for fire, and the message from Allenthedestroyer shows icons that have a bullseye on a dartboard.

FIG. 11 shows an expanded communication region (500, 550, and 600) showing a clan channel. In the clan channel, only messages from within a clan are displayed. The expanded communication region also shows a scrolling message in the announcement region (600).

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A user interface on a mobile device comprising:
   an integrated communication region positioned within a viewable area of an application on the mobile device,
   wherein the integrated communication region is configured to display a preview of content of a first message of a plurality of messages sent by a plurality of users,
   wherein the first message is a most recent message of the plurality of messages,
   wherein visibility of the preview is persistent across a plurality of screens of the application, and
   wherein across the plurality of screens of the application, (i) a position of the preview within the integrated communication region and (ii) the visibility of the preview remain unchanged until displaced by a second message, wherein the second message is more recent than the first message.

2. The user interface of claim 1, wherein the plurality of messages are real-time messages.

3. The user interface of claim 1, wherein information corresponding to the plurality of messages is displaced from the integrated communication region only by new messages.

4. The user interface of claim 1, wherein, based on features of the content of the first message, the preview comprises one or more features selected from the group consisting of flashing text, flashing images, multiple colors, and animated icons.

5. The user interface of claim 1, wherein:
   selecting the integrated communication region opens an expanded communication region, and
   in the expanded communication region, the first message is accompanied by a time indicator noting time elapsed since the first message was sent.

6. The user interface of claim 1, wherein the integrated communication region is persistent across multiple applications including the application.

7. The user interface of claim 1, wherein the integrated communication region is configured to display, adjacent to the preview, an indication of identity of a user of the plurality of users that sent the first message.

8. The user interface of claim 7, wherein the indication of the identity of the user includes a unique alias of the user.

9. The user interface of claim 1, wherein the integrated communication region is configured to display N previews of respective content of N messages including the preview of content of the first message, wherein N is an integer greater than one.

10. The user interface of claim 9, wherein the integrated communication region is configured to:
    in response to displacing the first message by the second message, display both (i) the preview and (ii) a second preview of the second message,
    wherein across the plurality of screens of the application, (i) a position of the second preview within the integrated communication region and (ii) a visibility of the second preview remain unchanged until displaced by a third message, wherein the third message is more recent than the second message.

11. The user interface of claim 1, wherein the integrated communication region is configured to, in response to displacing the first message by the second message,
    draw attention to the second message for a predetermined period of time.

12. The user interface of claim 11, wherein the integrated communication region is configured to, during the predetermined period of time, render a preview of the second message with flashing text.

13. The user interface of claim 1, wherein the plurality of messages includes messages from a plurality of channels, and wherein the integrated communication region is configured to display, adjacent to the preview, an indication of a channel of the plurality of channels from which the first message was received.

14. The user interface of claim 13, wherein:
    the application is used by a first user,
    the plurality of channels includes a group channel and a world channel,
    the group channel includes messages sent in association with a group to which the first user belongs, and
    the world channel includes messages sent irrespective of membership in the group.

15. The user interface of claim 14, wherein the plurality of channels includes a system announcements channel.

16. The user interface of claim 14, wherein messages from the world channel are filtered based on language.

17. A method for displaying information within a viewable area on a mobile device display, the method comprising:
    displaying a plurality of screens of an application within a first portion of the viewable area on the mobile device display; and
    displaying information in an integrated communication region within a second portion of the viewable area on the mobile device display,
    wherein the information includes a preview of content of a first message of a plurality of messages sent by a plurality of users,
    wherein visibility of the preview is persistent across the plurality of screens, and
    wherein across the plurality of screens, (i) a position of the preview within the integrated communication region and (ii) the visibility of the preview remain unchanged until displaced by a second message, wherein the second message is more recent than the first message.

18. The method of claim 17, wherein, based on features of the content of the first message, the preview comprises one or more features selected from the group consisting of flashing text, flashing images, multiple colors, and animated icons.

19. The method of claim 17, further comprising, in response to a user of the mobile device display selecting the integrated communication region, displaying an expanded communication region and displaying the preview accompanied by a time indicator noting time elapsed since the first message was sent.

20. The method of claim 17, further comprising displaying, adjacent to the preview, an indication of identity of a user of the plurality of users that sent the first message.

21. The method of claim 20, wherein the indication of the identity of the user includes a unique alias of the user.

22. The method of claim 17, further comprising displaying N previews of respective content of N messages including the preview of content of the first message, wherein N is an integer greater than one.

23. The method of claim 22, further comprising:
in response to displacing the first message by the second message, displaying both (i) the preview and (ii) a second preview of the second message,
wherein across the plurality of screens of the application, (i) a position of the second preview within the integrated communications region and (ii) a visibility of the second preview remain unchanged until displaced by a third message, wherein the third message is more recent than the second message.

24. The method of claim 17 further comprising, in response to displacing the first message by the second message, drawing attention to the second message for a predetermined period of time.

25. The method of claim 24 further comprising, during the predetermined period of time, rendering a preview of the second message with flashing text.

26. The method of claim 17, wherein the plurality of messages includes messages from a plurality of channels, and wherein the method further includes displaying, adjacent to the preview, an indication of a channel of the plurality of channels from which the first message was received.

27. The method of claim 26, wherein:
the application is used by a first user,
the plurality of channels includes a group channel and a world channel,
the group channel includes messages sent in association with a group to which the first user belongs, and
the world channel includes messages sent irrespective of membership in the group.

28. The method of claim 27, wherein the plurality of channels includes a system announcements channel.

29. The method of claim 27, further comprising filtering messages from the world channel based on language.

30. A non-transitory computer readable medium containing program instructions for displaying information in a viewable area on a mobile device comprising:
computer code that displays a plurality of screens of an application within a first portion of the viewable area; and
computer code that displays communication information within an integrated communication region within a second portion of the viewable area,
wherein the communication information includes a preview of content of a first message of a plurality of messages sent by a plurality of users,
wherein visibility of the preview is persistent across the plurality of screens, and
wherein across the plurality of screens, (i) a position of the preview within the integrated communication region and (ii) the visibility of the preview remain unchanged until displaced by a second message, wherein the second message is more recent than the first message.

31. The non-transitory computer readable medium of claim 30, wherein, based on features of the content of the first message, the preview comprises one or more features selected from the group consisting of flashing text, flashing images, multiple colors, and animated icons.

32. The non-transitory computer readable medium of claim 30, further comprising computer code that, in response to a user of the mobile device selecting the integrated communication region, displays an expanded communication region and, in the expanded communication region, displays the preview accompanied by a time indicator noting time elapsed since the first message was sent.

33. The non-transitory computer readable medium of claim 30, further comprising computer code that displays, adjacent to the preview, an indication of identity of a user of the plurality of users that sent the first message.

34. The non-transitory computer readable medium of claim 33, wherein the indication of the identity of the user is includes a unique alias of the user.

35. The non-transitory computer readable medium of claim 30, further comprising computer code that display N previews of respective content of N messages including the preview of content of the first message, wherein N is an integer greater than one.

36. The non-transitory computer readable medium of claim 35, further comprising:
computer code that, in response to displacing the first message by the second message, displays both (i) the preview and (ii) a second preview of the second message,
wherein across the plurality of screens of the application, (i) a position of the second preview within the integrated communications region and (ii) a visibility of the second preview remain unchanged until displaced by a third message, wherein the third message is more recent than the second message.

37. The non-transitory computer readable medium of claim 30 further comprising computer code that, in response to displacing the first message by the second message, draws attention to the second message for a predetermined period of time.

38. The non-transitory computer readable medium of claim 37 further comprising computer code that, during the predetermined period of time, renders a preview of the second message with flashing text.

39. The non-transitory computer readable medium of claim 30, wherein the plurality of messages includes messages from a plurality of channels, and further comprising computer code that displays, adjacent to the preview, an indication of a channel of the plurality of channels from which the first message was received.

40. The non-transitory computer readable medium of claim 39, wherein:
the application is used by a first user,
the plurality of channels includes a group channel and a world channel,
the group channel includes messages sent in association with a group to which the first user belongs, and
the world channel includes messages sent irrespective of membership in the group.

41. The non-transitory computer readable medium of claim 40, wherein the plurality of channels includes a system announcements channel.

42. The non-transitory computer readable medium of claim 40, further comprising computer code that filters messages from the world channel based on language.

\* \* \* \* \*

UNITED STATES PATENT AND TRADEMARK OFFICE
CERTIFICATE OF CORRECTION

| | | |
|---|---|---|
| PATENT NO. | : 8,918,725 B2 | Page 1 of 1 |
| APPLICATION NO. | : 13/221821 | |
| DATED | : December 23, 2014 | |
| INVENTOR(S) | : Kenshi Arasaki et al. | |

It is certified that error appears in the above-identified patent and that said Letters Patent is hereby corrected as shown below:

In The Specification
Column 10, Line 34, After "ease", delete "at which", and

In The Claims
Column 16, Line 23, In Claim 34, After "user", delete "is".

Signed and Sealed this
Seventh Day of July, 2015

Michelle K. Lee
*Director of the United States Patent and Trademark Office*